United States Patent
Schulte-Ladbeck et al.

(10) Patent No.: US 6,840,545 B2
(45) Date of Patent: Jan. 11, 2005

(54) WELDED FLANGE CONNECTION

(76) Inventors: Bernd Schulte-Ladbeck, 5747 Rutherglen, Houston, TX (US) 77096; Oscar O. Jimenez, 2919 Park Oak, Houston, TX (US) 77017

(*) Notice: Subject to any disclaimer, the term of this patent is extended or adjusted under 35 U.S.C. 154(b) by 0 days.

(21) Appl. No.: 10/277,334

(22) Filed: Oct. 22, 2002

(65) Prior Publication Data

US 2003/0075919 A1 Apr. 24, 2003

Related U.S. Application Data

(60) Provisional application No. 60/346,233, filed on Oct. 22, 2001.

(51) Int. Cl.[7] ............................................. F16L 13/02
(52) U.S. Cl. ..................... 285/21.1; 285/21.2; 285/368; 29/890.14
(58) Field of Search ................................ 285/21.2, 368, 285/21.1, 288.5, 288.7, 412; 29/890.14

(56) References Cited

U.S. PATENT DOCUMENTS

| | | | | |
|---|---|---|---|---|
| 2,992,838 A | * | 7/1961 | Wallace | 285/21.1 |
| 3,650,550 A | * | 3/1972 | West | 285/55 |
| 3,968,552 A | | 7/1976 | Hunter | |
| 4,743,320 A | | 5/1988 | Shaw | |
| 5,149,142 A | * | 9/1992 | Walko et al. | 285/14 |
| 5,171,041 A | * | 12/1992 | McMillan et al. | 285/21.2 |
| 5,407,514 A | | 4/1995 | Butts et al. | |
| 5,478,118 A | | 12/1995 | Barq et al. | |
| 5,505,898 A | * | 4/1996 | Goto et al. | 264/275 |
| 6,394,501 B1 | * | 5/2002 | Bryant, III | 285/21.1 |
| 6,398,264 B1 | * | 6/2002 | Bryant, III | 285/21.2 |

* cited by examiner

*Primary Examiner*—David Bochna
(74) *Attorney, Agent, or Firm*—Shook, Hardy & Bacon L.L.P.

(57) ABSTRACT

A welded flange connection and methods and apparatus for producing the connection are disclosed. A weld insert is disposed between the flared ends of abutted plastic pipe or plastic-lined pipe sections. The weld insert includes an annular support disc having a resistance heating element disposed at least about the inner circumference of the disc. When held tightly between the flared ends of abutted pipe sections power can be applied to the heating element to produce sufficient heat to temporarily raise the temperature of the adjacent surfaces of the flared sections of pipe above their melting point. When the weld is cooled, a strong, fluid-tight, thermoplastic weld is formed. A welded flange connection using the weld insert of the present invention effectively and efficiently produces high quality, fluid-tight connections in plastic pipe and plastic-lined piping systems. Further, by reapplying power to the insert which remains embedded in the weld, the method of the present invention permits the weld to be easily disassembled when necessary for repairs to the pipe system.

32 Claims, 5 Drawing Sheets

WELDED FLANGE CONNECTION

This application claims benefits of Provisional application 60/346,233 filed Oct. 22, 2001.

BACKGROUND OF THE INVENTION

1. Field of the Invention

The present invention relates to the welding of pipe systems used in the chemical industry. More specifically, the present invention relates to an improved welded flange connection and to methods and apparatus for producing such a connection by thermowelding plastic pipes or plastic-lined pipes.

2. Description of the Background

Plastic pipe systems and plastic-lined pipe systems are used in industrial plants to transport corrosive chemicals. These pipe systems are constructed of a plurality of plastic pipes or plastic-lined pipes fitted together using flange connections. The typical chemical plant will employ thousands of flange connections to produce several miles of interconnected plastic pipe or plastic-lined pipe. Many of the chemicals carried by these pipe systems are hazardous. Thus, any release of chemicals, even a small one, due to a failure in these pipe systems, can cause significant damage to the environment and to human life. Accordingly, the integrity of these thousands of welded flange connections is critical.

Because of environmental concerns, chemical plants must monitor these flange connections on a regular basis. Even the smallest leak must be reported to environmental authorities. Monitoring is often accomplished by sniffing each flange connection at a monthly cost which may range up to as much as $15.00 per connection. Thus, in the typical plant, monitoring costs often exceed several hundred thousand dollars per year. However, even with constant monitoring, there are no guarantees that leaks will not develop. Thus, the industry has long sought improved connections and methods of producing those connections.

The most commonly used method for welding plastic pipe or plastic-lined pipe is butt-welding. With plastic pipe systems, adjacent flanged pipe sections are merely welded by conventional thermowelding of the abutted ends of pipe sections. With plastic-lined systems, the plastic liner is first butt welded. After the liner is welded, a steel coupling is swaged or welded over the thermowelded connection of the plastic liner. While providing a welded seal, these systems do not permit the thermowelded connection to be hydrotested at the final operating pressure prior to placement of the steel coupling over the connector. Further, the welds in most of these systems are permanent, i.e., the thermowelded connection cannot be reversed and separated. Therefore, if a section of the plastic pipe or lining should fail, or if the welded connection itself should fail or need to be replaced, the connection will have to be cut out and re-welded from each end. These conventional thermowelding methods and connections have been described in a number of patents.

For example, the Wallace patent (U.S. Pat. No. 2,992,838) discloses a pipe joint having a heated sealing means. In Wallace, a pipe joint is sealed by first bolting together two sections of pipe to form a mechanical seal. The pipe sections are secondarily sealed using a small strip of thermoplastic material which, when heated, is fused between the sealed adjacent faces of two small fins extending from the outer surface of each pipe section. Thus a seal is formed between the two fins. While a thermoplastic seal is formed between the pipe sections by way of these small fins, the seal created is a weak seal which would most likely be incapable of withstanding high pressure. Further, the seal, itself, is directly exposed to the pipe interior and would be subject to attack by any corrosive materials therein. Thus, the seal disclosed in Wallace is not suitable for joining pipe transporting hazardous or corrosive materials under high pressure.

The Hunter patent (U.S. Pat. No. 3,968,552) discloses a method and apparatus for forming a plastic-lined junction in plastic-lined pipe. In Hunter, a groove is first forming in the outer surface of each pipe at a predetermined distance from the end of each pipe section to be joined. A compression ring is then fitted into each groove. A flange is then mated with each compression ring. A plastic end-face liner is then inserted through the open end of each pipe section and bonded to the plastic lining of the pipe. The abutting faces of the flanges on each pipe section are then bolted together and, for added rigidity, sealed with an epoxy or other suitable material. The Hunter connection, while suitable for sealing plastic-lined pipe, does not allow for rapid repair. A portion of the pipe must be cut out and removed to repair the connection.

These and other prior art systems suffer from the aforementioned disadvantages. Thus, the chemical industry has continued to seek improved connections and methods for producing those connections for use with plastic pipe systems and, particularly, plastic-lined pipe systems. Accordingly, there has been a long felt need for a method of welding plastic or plastic-lined pipe to produce a solid weld, shielded from the corrosive contents of the pipe system, yet accessible for easy testing. Further, such a weld should be reversible to facilitate repair and replacement where necessary. Finally, such welds and methods of producing them must be economical and efficient to use. The present invention solves those needs.

SUMMARY OF THE INVENTION

The present invention overcomes the disadvantages of the prior art by providing a welded flange connection and methods and apparatus for forming such a connection between the flared ends of adjacent plastic pipe or plastic-lined pipe sections. The method for forming the welded flange connection includes placing a weld insert, comprising an annular support ring including a resistance heating element, between the flared ends of plastic pipes or plastic-lined pipes and heating the element to temporarily raise the temperature of the adjacent plastic above the melting point of the thermoplastic material of the pipe or lining. A fluid-tight seal is formed upon cooling of the melted plastic.

In the preferred embodiment, the weld insert remains embedded in the fluid-tight connection after completion of the weld. Thus, the weld can be easily disassembled when necessary. To disassemble the weld, current is again applied to the heating element to raise the temperature of the adjacent, welded thermoplastic material of the flared ends above its melting point. Once the plastic is sufficiently melted, the weld can be pulled apart, any leaks repaired, and the connection re-welded. The thermoplastic weld formed by the present invention is fluid-tight and, after welding, can be hydrotested to the final operating pressure or greater. If the plastic weld should fail and any leakage occurs, the weld can be easily repaired.

In the preferred embodiment of the present invention, the weld insert comprises an annular support disc having an inner and an outer circumference. Disposed about at least the inner circumference is a resistance heating element of sufficient size and density to produce sufficient heat to temporarily raise the temperature of the adjacent thermoplastic material of the flared ends of plastic pipe or plastic-lined pipe above its melting point. Upon cooling, the temporarily melted thermoplastic material adjacent the weld insert of the present invention produces a fluid-tight seal radially inwardly of the inner circumference of the insert. The weld insert produces uniform melting of the flared plastic ends of the plastic pipe sections or plastic linings to produce an improved seal. Uniform melting of the plastic provides a stronger weld, thereby reducing the need for weld repair.

The methods for forming a welded flange connection, the weld insert used in those methods and the thermowelded connections formed by those methods, all in accord with the present invention, solve the problems of leakage and repair associated with prior art systems using plastic and plastic-lined pipes to transport corrosive chemicals by producing a stronger, fluid-tight weld. Further, the methods of the present invention are easier, more efficient and less expensive to perform. Finally, the connections of the present invention can be rapidly disassembled, if repairs become necessary. Thus, the methods and apparatus of the present invention have solved the long felt, but unfulfilled, needs of the industry for improved thermowelded connections and methods for producing those connections.

BRIEF DESCRIPTION OF THE DRAWINGS

Other features and intended advantages of the present invention will be more readily apparent by reference to the following description in connection with the accompanying drawings wherein.

While the invention will be described in connection with the presently preferred embodiment, it will be understood that it is not intended to limit the invention to that embodiment. To the contrary, it is intended to cover all alternatives, modifications and equivalents as may be included in the spirit of the invention as defined in the appended claims.

DETAILED DESCRIPTION OF THE INVENTION

The present invention provides improved methods and apparatus for welding plastic, flanged, pipe members. Such members include both plastic pipe and plastic-lined pipe. A strong, fluid-tight thermoplastic weld is produced by the novel, non-obvious methods of the present invention using a weld insert designed specifically for use in those methods.

The plastic pipes and linings with which the methods of the present invention can be used may be constructed of any appropriate plastic material. Pipe materials which are most suitable for the disclosed methods include all melt processable, thermoplastic materials. Examples of such materials include high density polyethylene (HDPE), medium density polyethylene (MDPE), low density polyethylene (LDPE), linear low density polyethylene (LLDPE), chlorotrifluoroethylene (CTFE), ethylene-tetrafluoro ethylene (ETFE), ethylenechlorotrifluoro ethylene copolymer (E-CTFE), polypropylene (PP), perfluoro-ethylenepropylene copolymer (FEP), ethylene-propylene copolymer (EPM), polyvinyl chloride (PVC), chlorinated polyvinyl chloride (CPVC), polyvinylidene chloride (PVDC), vinylidene fluoride (VDF), polyvinylidene fluoride (PVDF), perfluoromethoxy (MFA), perfluoroalkoxyalkanes (PFA) and polyamide (PA). The presently most preferred thermoplastics for use in the present invention include polypropylene (PP), polyvinylidene fluoride (PVDF) and perfluoroalkoxyalkanes (PFA).

The methods for producing a welded flange connection comprise several steps: placing an annular weld insert including a resistance heating element between the flared ends of two opposed plastic or plastic-lined pipe members; applying pressure to the opposed, flared ends of the pipe sections with the insert therebetween; applying a sufficient current to the resistance heating element of the insert at a sufficient voltage and for a sufficient time to produce sufficient heat to temporarily raise the temperature of the abutting surfaces of the plastic flanges adjacent and radially inwardly of the weld insert above their melting temperatures; discontinuing heating once the plastic has temporarily melted; and forming a seal radially inwardly of the insert upon cooling of the plastic.

In the methods of the present invention, the weld is produced by placing the weld insert between the abutting surfaces of the flared ends of the pipe members to be joined. Pressure is then applied by a conventional coupling or flange placed over the abutting flared ends of the plastic pipe and the weld insert, thus urging the flared ends together with the weld insert in between. The weld insert comprises an annular support disc having an inner circumference and an outer circumference. In the presently preferred embodiment, a resistance heating element is disposed along at least the inner circumference of the weld insert. The element is heated by apply power at a voltage and current and for a time sufficient to temporarily raise the temperature of the adjacent thermoplastic material above its melting point. During heating, the pipe sections are continuously urged together by applying pressure longitudinally along the axes of the two pipe sections. A melt will be formed by the melting plastic adjacent the heating element on the inner circumference of the weld insert. Heating continues until the plastic is sufficiently melted, resulting in the weld insert being embedded in the flared plastic ends of the joined pipes. Heating is then discontinued and a fluid-tight weld is formed radially inwardly of the inner circumference of the weld insert upon cooling of the plastic. The weld insert remains embedded in the weld of the jointed pipes.

When applying power to the heating element, power should be applied at a rate to produce a watt-density of about 20–60 watt/square inch in the area of the heating element. Preferably power is applied at a rate to produce a watt-density of about 20–40 watt/square inch, most preferably about 25–40 watts/square inch. The methods of the present invention are particularly appropriate for use with smaller diameter pipe, e.g., pipe having a diameter up to about six inches. For pipe having a diameter up to about six inches, the desired watt-density is achieved with a voltage typically in the range of about 3–60 volts and preferably about 10–45 volts. The current will typically be in the range of about 3–10 amps and preferably about 5–7 amps. With a current of less than about 3 amps or a voltage of less than about 3 volts, it is difficult to achieve the temperatures required to temporarily melt the plastic comprising the flanges of the plastic lining or plastic pipe. At current and voltage greater than about 10 amps and 60 volts, respectively, the rate of heating is accelerated, making prevention of excessive melting of the adjacent plastic more difficult. For larger diameter pipe, e.g., pipe having a diameter up to twelve inches or more, higher voltage will be required to produce the desired watt-density.

The time over which power is applied is determined by the melting temperature of the thermoplastic material which forms the weld. Thermoplastic materials having higher melt temperatures typically require longer times and higher power inputs to exceed the higher melt temperatures. However, it is desirable to adjust the power input so that the heating time does not exceed about 180 seconds. The heating time should preferably not exceed about 160 seconds and most preferably be within the range of about 50–120 seconds. As the voltage and current is increased, the heating time can be decreased. With prolonged heating at higher temperatures, damage to the plastic pipe sections may result. Accordingly, adjustment of the voltage and/or current to give the desired watt-density within the foregoing times is preferred. The material composition and diameter of pipe sections to be joined will determine the preferred voltage, current and heating time within the foregoing ranges. Preferred values are readily selected by those skilled in the art, once the specific thermoplastic material and size of the pipe sections have been ascertained.

A weld produced using the present methods can be easily disassembled for repair or replacement merely by applying power to reheat the heating element of the embedded weld insert. During heating, the joined pipe sections are pulled apart. Heating continues until the melting point of the plastic has again been temporarily exceeded and the plastic becomes sufficiently melted to allow the two abutting sections to be separated.

Figure 1:
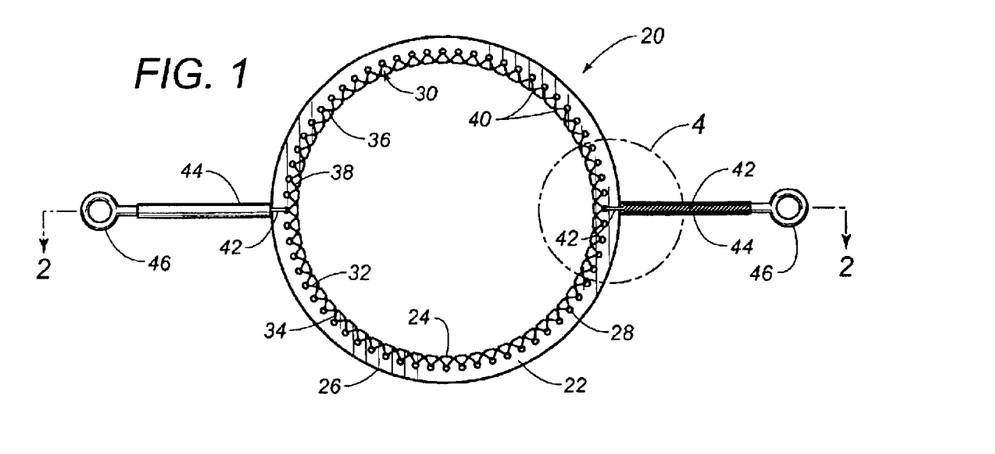
FIG. 1 is a view of the front or face of a weld insert comprising an annular disc including a heating element in accord with the present invention.
Figure 2:
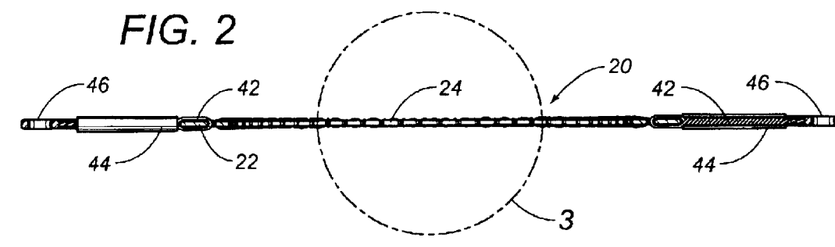
FIG. 2 is a partial cross-sectional view of the weld insert of FIG. 1 along the line 2—2 illustrating the side of the annular disc and heating element in accord with the present invention.
Figure 3:
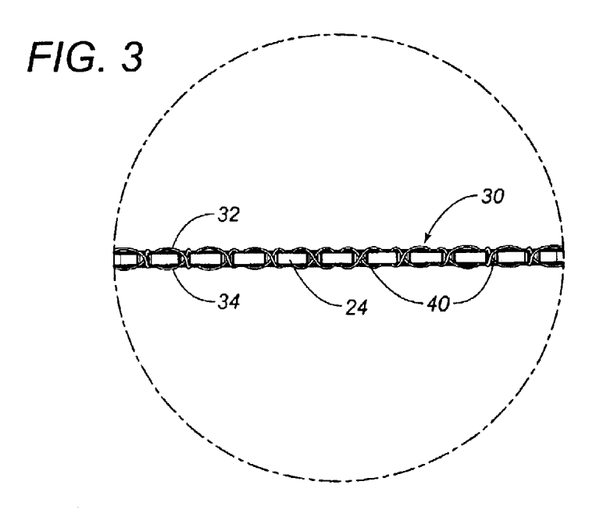
FIG. 3 is an enlarged view of the area identified in FIG. 2 illustrating more clearly the heating element disposed along the inner circumference of the annular disc of a weld insert in accord with the present invention.

The present invention will now be described with specific reference to the weld inserts and welded connections illustrated in FIGS. 1–11. The present invention also includes a weld insert 20 to be used with the above methods for producing a welded flange connection. FIGS. 1 and 2 illustrate a weld insert in accord with the present invention. The weld insert 20 comprises an annular disc 22 of a diameter which will permit it to be positioned within the flared ends of a thermoplastic pipe. Disc 22 is defined by inner circumference 24 and outer circumference 26. Preferably the diameter of the inner circumference 24 of disc 22 should be no more than about one-half inch (0.5"), more preferably no more than about one-quarter inch (0.25"), less than the outer diameter of the flared ends of the plastic pipe or pipe lining to be joined by the weld. Disc 22 should be less than about 0.100 inch thick, preferably about 0.010–0.060 inch thick and most preferably about 0.020–0.040 inch thick. Thicker discs tend to hinder weld formation by making it more difficult to bring the abutting flanged ends into sufficient contact adjacent the insert to facilitate heating and weld formation. Thinner discs may lack the structural integrity necessary for handling in the field. Disc 22 is constructed of any appropriate material. Disc 22 is preferably constructed of a plastic having a melting point less than or equal that of the plastic forming the flanges of the pipe members to be joined and chemically compatible with that plastic. By chemically compatible, it is meant that the material comprising disc 22 is capable of bonding with the melted material comprising the flanges of the pipe members. Exemplary materials from which disc 22 may be constructed are the thermoplastics listed above. Most preferably disc 22 is constructed of the same plastic as the flanges of the pipe members to be joined. When so constructed disc 22 will help form the seal between the abutting pipe members. Weld insert 20 also includes a plurality of holes 28 evenly spaced around the disc. Finally, weld insert 20 preferably includes a plurality of grooves 40 evenly spaced along inner circumference 24, each groove 40 placed mid-way between each hole 28.

FIGS. 1–4 illustrate the resistance heating element 30 disposed on disc 22. Heating element 30 comprises a plurality of electrical conducting wires 32, 34, 36, 38 threaded through holes 28 of weld insert 20. Resistance wires 32, 34, 36, 38 are formed of any appropriate conductive material, e.g., conventional Ni—Cr (nickel-chromium) wiring. Wire having a diameter of at least about 0.010 inch, preferably about 0.010–0.030 inch and more preferably about 0.010–0.020 inch should be used. While larger diameter wire should be satisfactory, smaller diameters are preferred. Most preferred is wire having a diameter of about 0.010 inch. Wire having a diameter less than about 0.010 inch has been found to be unsatisfactory. Such wire is too fine to provide the structural strength required for manufacturing.

FIG. 1 illustrates how each electrical conducting wire 32, 34, 36, 38 is threaded along one half of the inner circumference 24 of annular support disc 22 to produce a heating element 30 extending completely around the inner circumference 24 of disc 22. Grooves 40 help position wires 32, 34, 36, 38 evenly around disc 22 so that the heat produced by heating element 30 of weld insert 20 is evenly distributed. Wires 32, 34 are threaded about one half of disc 22 passing alternately through holes 28 and grooves 40 and alternating from side to side around the disc. Similarly, wires 36, 38 are threaded about the other half of disc 22, again starting with one wire on each side of the disc. Thus, all four wires produce a heating element 30 symmetrically disposed along the full inner circumference 24 of both sides of disc 22.

Figure 4:
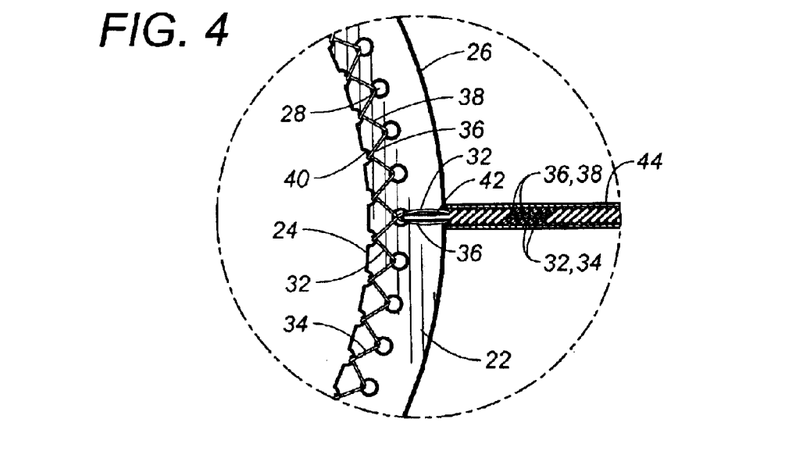
FIG. 4 is an enlarged view of the area identified in FIG. 1 illustrating more clearly the resistance heating element comprising wires threaded through a plurality of holes along the inner circumference of the annular disc of a weld insert in accord with the present invention.

The threading of electrical conducting wires 32, 34, 36, 38 through holes 28 and along grooves 40, along with support wire 42 is more readily understood by reference to expanded FIG. 4. FIG. 4 illustrates how each electrical conducting wire is threaded over the inner edge 24 of annular plastic disc 22 along grove 40 and through holes 28 before exiting weld insert 20 and being twisted within support wires 42. Two support wires 42 are connected to annular disc 22, preferably at diametrically positioned locations on the disc 22, i.e., about 180 degrees apart. Support wires 42 may be attached to disc 22 by any method, e.g., wires 42 can pass through a pair of diametrically disposed holes 28 as illustrated or could be affixed through additional holes (not illustrated) placed nearer outer circumference 26 of disc 22. In the presently preferred embodiment, support wires 42 are twisted about conducting wires 32, 34, 36, 38 as illustrated and protected by heat-shrinkable, insulating, plastic tubing 44. Finally, the conducting wires 32, 34, 36, 38 are attached to an appropriate electrical connector 46 on each side of the insert. While connector 46 is illustrated as a simple loop or eye, those skilled in the art could select any desired electrical connector or plug, keeping in mind that the connector will remain exposed after completion of the weld.

Figure 5:
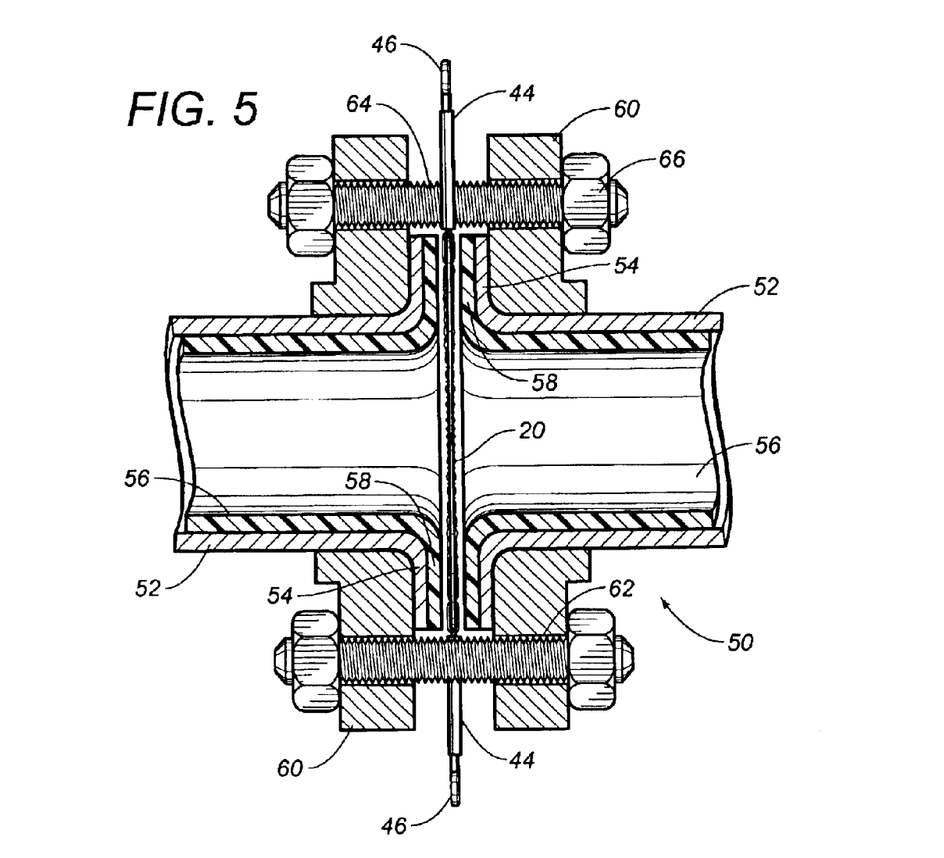
FIG. 5 is a cross-sectional view illustrating the use of a weld insert positioned between the flared ends of abutted, plastic-lined pipe sections prior to make-up to produce a welded joint in accord with the present invention.

FIG. 5 illustrates use of weld insert 20 of the present invention to form a welded connection 50 between abutted plastic-lined pipe sections. In forming a weld connection, weld insert 20 is placed between the flared ends of two opposed plastic-lined pipe members, each comprising a metal pipe 52 with a plastic lining 56. Alternatively, the weld could be formed between abutted plastic pipe sections. See FIG. 9. Pipe 52 includes flared ends 54. Lining 56 includes flared ends 58. Longitudinal pressure urging the abutting pipe sections together along the axes of the pipe sections is applied via couplings 60 disposed about the flared pipe ends. Conventional couplings 60 include a plurality of symmetrically disposed holes 62. Bolts 64 are placed through the holes and tightened with nuts 66 to form a mechanical seal between abutted flared ends 58 of opposed plastic linings 56. FIG. 5 illustrates the placement of weld insert 20 between the flared ends 58 of linings 56 before the tightening of coupling 60 and formation of the weld.

Figure 6:
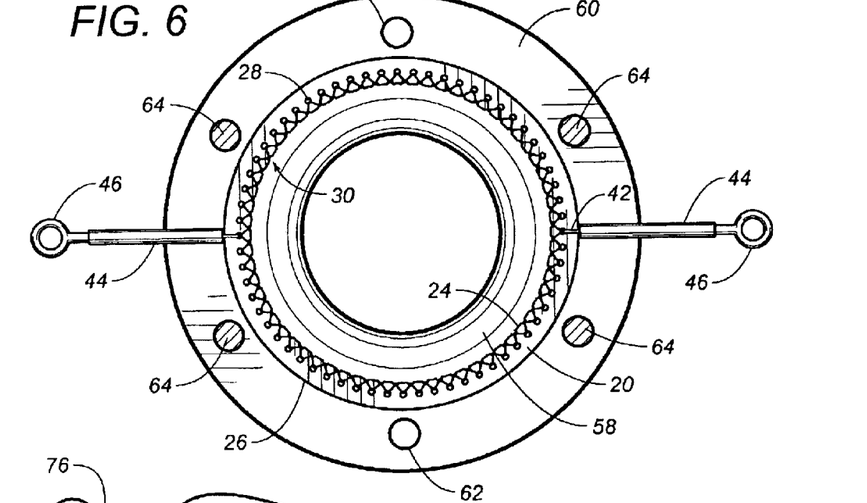
FIG. 6 is an end view illustrating a weld insert between the flanges of two opposing, plastic-lined pipe members in accord with the present invention positioned adjacent the flared end of a plastic-lined pipe section and including a flanged connection.

FIG. 6 illustrates an end view of weld insert 20 positioned on flared face 58 of plastic lining 56. FIG. 6 illustrates the placement of insert 20 and thus heating element 30 near the outer periphery of flared end 58 of plastic lining 56. Weld insert 20 will be held tightly between the two opposing, flared ends 58 of plastic lining 56 by the tightening of bolts 64 disposed through holes 62 of coupling 60.

Figure 7:
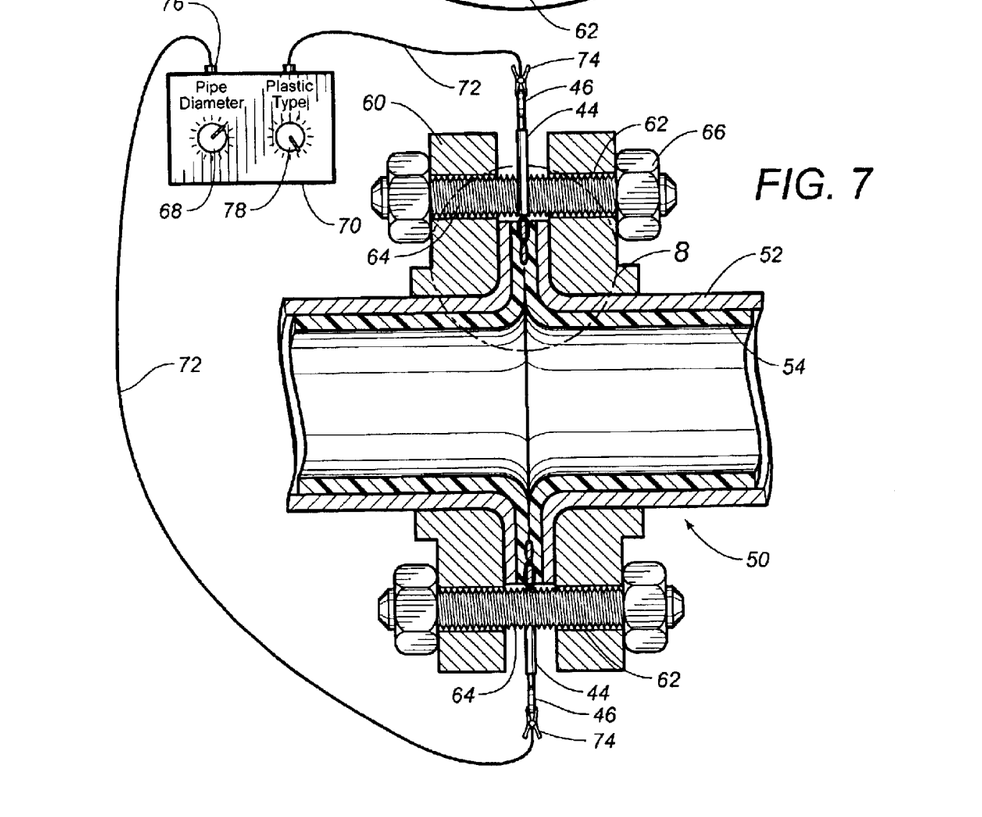
FIG. 7 is a cross-sectional view illustrating a thermoplastic welded joint in accord with the present invention whereby the heating element has been embedded in the plastic melt formed radially inwardly thereof by the melting of the opposing flared surfaces of the plastic-lined pipe sections.

Power is supplied to heating element 30 from a power source 70. FIG. 7 illustrates a welded flange connection with weld insert 20 in place and power source 70 attached. Weld insert 20 will be embedded in the plastic melt formed by the temporary melting of the thermoplastic material forming plastic flanges 58 in the area adjacent to and radially inwardly of resistance heating element 30. Electrical power is supplied to heating element 30 by power source 70 attached to connectors 46 of insert 20 by electrical leads 72 terminating in clips 74. Clips 74 connect power source contact leads 72 to connectors 46 and conductive wires 32, 34, 36, 38 of insert 20. While alligator clips 74 are illustrated, any electrical connector appropriate for connection to connectors 46 of insert 20 are appropriate. Electrical leads 72 are attached to terminals 76 of a low voltage power source 70, e.g., a battery or AC/DC power supply, capable of supplying the required output. They are connected when current for heating is transmitted to the weld insert and disconnected when current is no longer needed.

Power source 70 may include a control panel for manually or automatically controlling the level of heat generated by controlling the voltage and current supplied to annular disc 22, along with the time of application. Thus, the control panel regulates the temperature produced in the plastic adjacent to heating element 30 of weld insert 20. While these adjustments could be made manually, it is preferred that they be automatically controlled. In the embodiment illustrated in FIG. 7, power supply 70 includes a pair of dials 68, 78 through which the operator can easily adjust the output power provided to heating element 30. In this embodiment, dial 68 includes a plurality of settings corresponding to pipe diameters, e.g., one to six inch diameters in half inch increments. Dial 78 includes a plurality of settings corresponding to different thermoplastic materials. The power supply is programmed to provide a predetermined output, i.e., voltage and current, for a predetermined time, for each combination of diameter and plastic material. By selecting a given pipe size and material, the operator is able to deliver the desired watt-density for the desired time, thus, producing an optimum weld.

It should be remembered that during the heating process, the flared ends 58 of plastic liners 56 are constantly urged together by pressure applied through couplings 60. Pressure is applied to the heating element 30 and flared ends 58 of liners 56 prior to commencing the heating process by tightening of nuts 66 on bolts 64 to recommended torque values.

Figure 8:
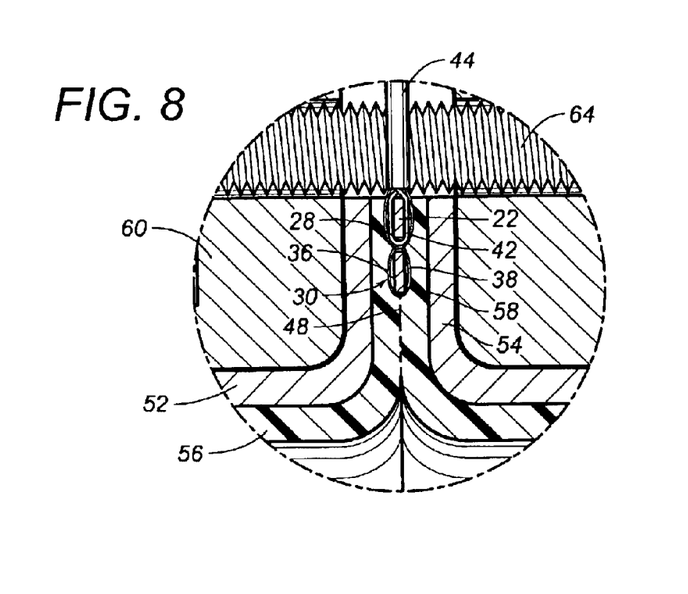
FIG. 8 is an enlarged view of the area identified in FIG. 7 illustrating a completed thermoplastic weld in accord with the present invention.

The completed welded connection 50 formed by weld insert 20 is further illustrated in FIG. 8. FIG. 8 is a cross-sectional enlargement of the completed welded connection showing the weld 48 formed radially inwardly of insert 20. Also illustrated is the position of a single hole 28 in disc 22 showing support wire 42 and electrical conducting wires 36, 38 on each side of disc 22. Wires 32, 34 similarly disposed on the other half of disc 22 are not illustrated. The weld 48 formed by the melted plastic radially inwardly of disc 22 after the heating of weld insert 20 is illustrated.

Figure 9:
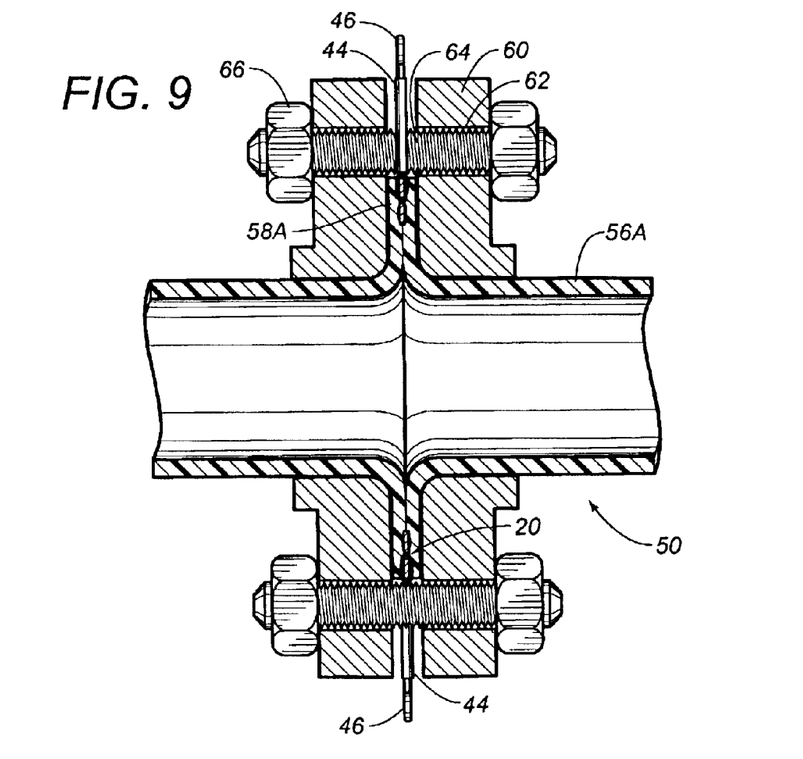
FIG. 9 is a cross-sectional view illustrating a completed welded joint in accord with the present invention formed between two abutted plastic pipes.

FIG. 9 illustrates a completed, welded flange connection formed with plastic pipe, rather than plastic-lined pipe. In general, the components in FIG. 9 are identical to those in FIG. 7 except that plastic pipe 56A with flared ends 58A is illustrated in place of steel pipe 52 with plastic lining 56. Otherwise, like reference numerals represent like components.

It will be apparent to those skilled in the art that many modifications to the described method and apparatus may be made without departing from the true scope and spirit of the invention. For example, in the preferred embodiment illustrated, the weld insert 20 comprises an annular disc 22. While annular disc 22 is preferably formed of the same plastic as the pipe to be welded, it can be formed of any suitable material, preferably of materials having a melting point less than or equal to that of the plastic of the pipe and being chemically compatible with the plastic of the pipe.

Figure 10:
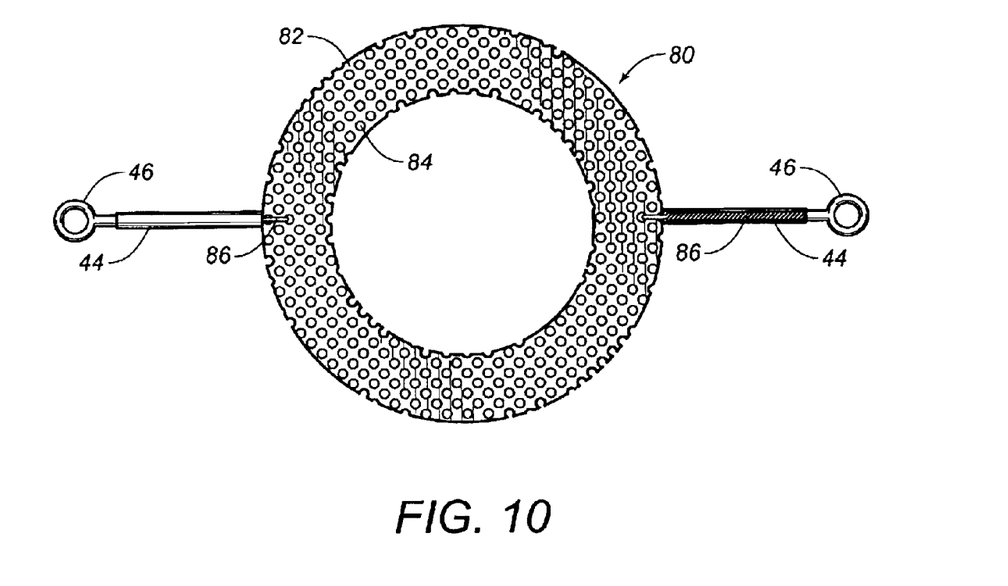
FIG. 10 is a view of the front or face of an alternative embodiment of a weld insert in accord with the present invention comprising an annular disc of a perforated, electrically conductive metal.
Figure 11:
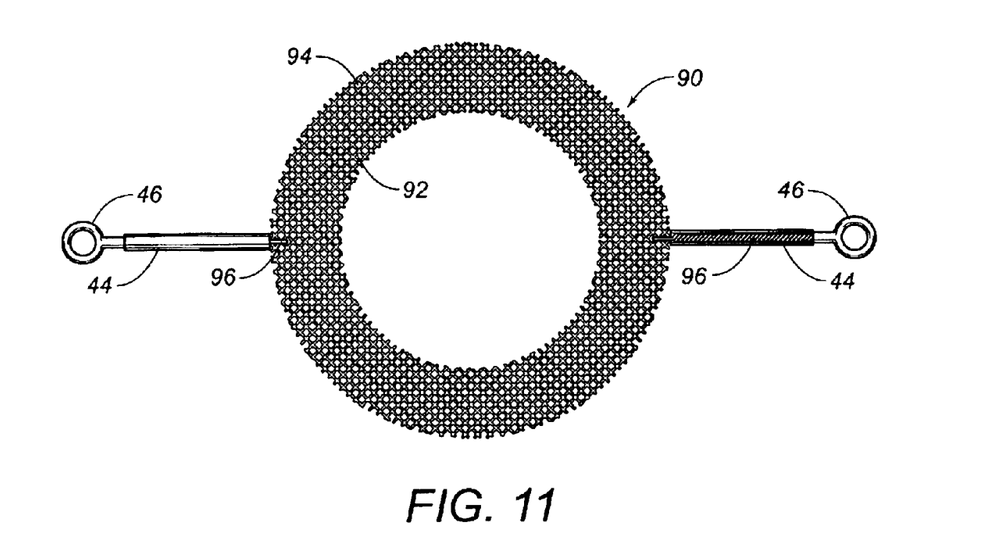
FIG. 11 is a view of the front or face of another alternative embodiment of a weld insert in accord with the present invention comprising an annular disc of an electrically conductive metal screen.

Alternate, less preferred embodiments of the weld insert might simply comprise metal inserts of a conductive metal such as those illustrated in FIGS. 10 and 11. In FIG. 10, weld insert 80 comprises an annular disc 82 containing a plurality of perforations 84. Wires 86 formed of any appropriate electrical conductor are shown attached to disc 82 at generally diametrically opposed positions. Wires 86 terminate in an appropriate electrical connector, e.g., loop or eye connector 46, and may be protected by an insulating cover, e.g., shrinkable plastic lining 44.

FIG. 11 illustrates still another weld insert 90 comprising a screen 92 formed of electrically conductive wires forming a plurality of openings 94. Wires 96 formed of any appropriate electrical conductor are attached to weld insert 90 at generally diametrically opposed locations. Again, wires 96 may be protected by insulating tubing 44 and terminate in appropriate connectors 46.

While inserts 20 of the type illustrated and described with reference to FIG. 1 are preferred, inserts such as those illustrated in FIGS. 10 and 11 may also be employed. Therefore, it is evident that the invention is not restricted to the preferred embodiments described and illustrated but covers all modifications which may fall within the scope of the following claims.

What is claimed is:

1. A method for producing a thermowelded connection between two pipe members, said pipe members including opposed flanges comprised of a melt processable thermoplastic material, comprising:

positioning an annular weld insert between the plastic flanges of each of two opposing pipe sections, such that the weld insert is positioned between and against abutting surfaces of the flanges of the two opposed pipe members, said weld insert formed of a rigid material chemically compatible with the thermoplastic material of said flanges and having an inner and an outer circumference;

urging the plastic flanges of the pipe sections into contact with each other and with the weld insert in between by applying and tightening a coupling about the abutting flanges of the opposed pipe members;

passing electrical current through a resistance heating element symmetrically disposed about the inner circumference of the weld insert to produce sufficient heat to raise the temperature of the thermoplastic material of the opposed flanges adjacent and radially inwardly of the heating element to at least the melting point of the thermoplastic material;

maintaining pressure longitudinally along the axes of the two opposed pipe members while heating the weld insert until the insert becomes embedded into the melting thermoplastic material;

removing the electrical current once the weld insert is bonded with the thermoplastic material; and allowing the thermoplastic material to cool below its melting temperature in order to form a thermowelded flange connection.

2. The method of claim 1 comprising applying sufficient pressure to force the melt produced by the heating of the weld insert radially and outwardly towards the edges of the thermoplastic flanges resulting in a plastic flange thickness that meets the minimum flare thickness required by ASTM.

3. The method of claim 1 wherein the weld insert is disposed near the outer periphery of the abutted flange surfaces and the heating element is disposed along an inner circumference of the weld insert.

4. The method of claim 3 wherein the heating element is disposed not more than about 0.5 inches from the outer periphery of the abutted flange surfaces.

5. The method of claim 1 wherein the pipe members are selected from the group consisting of plastic pipe members and plastic-lined pipe members.

6. The method of claim 1 wherein the resistance heating element is heated by applying sufficient electrical power for a time not exceeding about 180 seconds to produce a watt-density of about 20–60 watt/square inch in an area defined by the heating element.

7. A method for connecting two plastic or plastic-lined pipe members including opposed flanges comprised of a melt processable thermoplastic material, comprising:

placing an annular weld insert between the opposed plastic flanges of two plastic or plastic-lined pipe members, said weld insert formed of a material having a melting point less than or equal to about the melting point of the thermoplastic material of said flanges and having an inner and an outer circumference;

urging the pipe members and the weld insert into contact with each other, while the weld remains between the opposed flanges;

heating a resistance heating element symmetrically disposed about the inner circumference of the weld insert to produce sufficient heat to temporarily melt the thermoplastic material of the flanges adjacent and radially inwardly of the heating element so that the weld insert becomes integrated with the flanges of the opposing pipe members; and forming a thermowelded connection by discontinuing the heating of the heating element and allowing the thermoplastic material to cool below its melting temperature.

8. The method of claim 7 further comprising temporarily attaching the previously inserted weld insert to an external power source by use of electrical leads extending outwardly from the between the opposed flanges.

9. The method of claim 7 wherein heating continues for a predetermined time and at a power level selected to raise the temperature of the thermoplastic material adjacent and radially inwardly of the heating element above its melting temperature in less than about 180 seconds.

10. The method of claim 9 wherein power is applied at a voltage in a range of about 3–60 volts and a current in a range of about 3–10 amps.

11. The method of claim 9 wherein power is applied to produce a watt-density in an area defined by the heating element in a range of about 20–60 watt/square inch.

12. The method of claim 7 wherein the pipe members are urged together by applying force in longitudinal and circumferential directions along the axis of each flanged pipe member.

13. The method of claim 7 further comprising disassembling the thermowelded connection produced between two opposed pipe members, comprising:

re-applying electrical current to the weld insert embedded in the thermowelded flange connection;

heating the resistance heating element disposed within the thermowelded connection to produce a temperature sufficient to temporarily melt the thermowelded plastic of the connection;

applying force along the axes of the two opposed pipe sections forming the connection, said force applied to separate the pipe sections in order to aid in the breaking of the weld; and separating the previously welded opposing plastic flanges.

14. A weld insert adapted to produce a welded coupling connecting two opposed pipe members, said pipe members including opposed flanges of a melt processable thermoplastic material, comprising:

an annular disc formed of a rigid material and having an inner and an outer circumference;

a plurality of holes symmetrically disposed about the disc along a circular path between the inner and outer circumferences;

at least one electrical conductor disposed around the disc and through the holes to form a resistance heating element; and a pair of electrical connectors disposed outwardly of the outer circumference of the disc and in electrical contact with the conductor, said connectors adapted for connection to a power source.

15. The weld insert of claim 14 wherein the electrical conductor is threaded alternately between the holes and inner circumference of the disc to produce a resistance heating element along an inner periphery of the disc defined by the inner circumference and holes of the disc.

16. The weld insert of claim 15 wherein the outer circumference substantially corresponds to the diameter of the flanges of the pipe members to be welded.

17. The weld insert of claim 14 wherein the annular disc is comprised of a plastic characterized by a melting temperature less than or equal to about the melting temperature of the thermoplastic material of the flanges of the pipe members and a chemical compatibility with that thermoplastic material.

18. The weld insert of claim 14 wherein the annular disc is comprised of the thermoplastic material forming the flanges of the pipe members.

19. The weld insert of claim 14 wherein the annular disc is comprised of a thermoplastic material selected from the group consisting of high density polyethylene (HDPE), medium density polyethylene (MDPE), low density polyethylene (LDPE), linear low density polyethylene (LLDPE), chlorotrifluoroethylene (CTFE), ethylene-tetrafluoro ethylene (ETFE), ethylene-chlorotrifluoro ethylene copolymer (E-CTFE), polypropylene (PP), perfluoro-ethylene-propylene copolymer (FEP), ethylene-propylene copolymer (EPM), polyvinyl chloride (PVC), chlorinated polyvinyl chloride (CPVC), polyvinylidene chloride (PVDC), vinylidene fluoride (VDF), polyvinylidene fluoride (PVDF), perfluoromethoxy (MFA), perfluoroalkoxyalkanes (PFA) and polyamide (PA).

20. The weld insert of claim 14 wherein the annular disc is not more than about 0.100 inch in thickness.

21. The weld insert of claim 14 wherein the electrical conductor comprises a plurality of conductive wires, each having a diameter of at least about 0.010 inch.

22. The weld insert of claim 14 further including an external power source connected to the electrical connectors, said power source including controls for adjusting voltage, current and time of the power applied to the heating element of the weld insert.

23. The weld insert of claim 22 wherein the power source is capable of delivering a watt-density of about 20–60 watt/square inch in an area defined by the heating element.

24. A method for forming a thermowelded connection between the abutted flared ends of two tubular members made from identical or compatible thermoplastic materials, said method comprising:

positioning a weld insert between the facing surfaces of the flared ends of said tubular members, said weld insert comprising:

an annular support disc having an inner and an outer circumference, said disc being formed of a rigid material having a melting point less than or equal to about the melting point of said thermoplastic materials and being chemically compatible with those materials;

a resistance heating element symmetrically disposed about said inner circumference, said element upon passage of a current therethrough being capable of producing sufficient heat to raise the temperature of the abutting surfaces of said flared ends radially inwardly of said inner circumference above the melting point of said thermoplastic materials to produce an annular seal; and leads in electrical contact with said heating element for temporarily connecting said element with a source of electrical power;

placing an annular flange around said tubular members;

drawing the flared ends of said tubular member toward one another to form a mechanical seal between said abutting surfaces of said tubular members; and while maintaining said mechanical seal, applying a sufficient current to said resistance heating element for a sufficient time to raise the temperature of said thermoplastic materials radially inwardly of said inner circumference above their melting points for a time sufficient to form an annular weld;

removing the electrical current once said annular weld has been formed; and allowing said thermoplastic material to cool below its melting temperature to form a fluid-tight, thermowelded connection.

25. The method of claim 24 wherein the resistance heating element is heated by applying sufficient electrical power for a time not exceeding about 180 seconds to produce a watt-density of about 20–60 watt/square inch in an area defined by the heating element.

26. The method of claim 25 wherein power is applied at a voltage in a range of about 3–60 volts and a current in a range of about 3–10 amps.

27. A welded joint connecting two tubular members in a fluid-tight manner, said joint comprising:

first and second tubular members formed of identical or compatible thermoplastic materials;

said tubular members each outwardly flared on at least one end, said outwardly flared ends positioned adjacent and abutting one another;

a weld insert positioned between said abutting, flared ends, said insert comprising:

an annular support disc having an inner and an outer circumference, said disc being formed of a rigid material having a melting point less than or equal to about the melting point of said thermoplastic materials and being chemically compatible with those materials;

a resistance heating element symmetrically disposed about said inner circumference, said element upon passage of a current therethrough being capable of producing sufficient heat to raise the temperature of the abutting surfaces of said flared ends radially inwardly of said inner circumference above the melting point of said thermoplastic materials to produce an annular seal;

leads in electrical contact with said heating element for temporarily connecting said element with a source of electrical power; and an annular flange surrounding said tubular members and including means for drawing said flared ends of said adjacent tubular members toward one another, wherein the abutted surfaces of said flared ends radially inwardly of said heating element have been melted together by power applied to said heating element to form an annular, fluid-tight seal.

28. A weld insert for use in forming a fluid-tight connection between the abutted flared ends of two tubular members made from identical or compatible thermoplastic materials, said weld insert comprising:

an annular support disc having an inner and an outer circumference said disc being formed of a rigid material having a melting point less than or equal to about the melting point of said thermoplastic materials and being chemically compatible with those materials;

a resistance heating element symmetrically disposed about at least said inner circumference, said element upon passage of a current therethrough being capable of producing sufficient heat to raise the temperature of the abutting surfaces of said flared ends radially inwardly of said inner circumference above the melting point of said thermoplastic materials to produce an annular, fluid-tight seal; and leads in electrical contact with said heating element for temporarily connecting said element with a source of electrical power.

29. The weld insert of claim 28 wherein said disc is formed of a rigid material having a melting point less than or equal to about the melting point of said thermoplastic materials and is chemically compatible with those materials.

30. The weld insert of claim 28 wherein the annular disc is comprised of a thermoplastic material selected from the group consisting of high density polyethylene (HDPE), medium density polyethylene (MDPE), low density polyethylene (LDPE), linear low density polyethylene (LLDPE), chlorotrifluoroethylene (CTFE), ethylene-tetrafluoro ethylene (ETFE), ethylene-chlorotrifluoro ethylene copolymer (E-CTFE), polypropylene (PP), perfluoro-ethylene-propylene copolymer (FEP), ethylene-propylene copolymer (EPM), polyvinyl chloride (PVC), chlorinated polyvinyl chloride (CPVC), polyvinylidene chloride (PVDC), vinylidene fluoride (VDF), polyvinylidene fluoride (PVDF), perfluoromethoxy (MFA), perfluoroalkoxyalkanes (PFA) and polyamide (PA).

31. The weld insert of claim 28 wherein the annular disc is not more than about 0.100 inch in thickness.

32. The weld insert of claim 28 wherein the electrical conductor comprises a plurality of conductive wires, each having a diameter of at least about 0.010 inch.

* * * * *